United States Patent [19]

Wang

[11] Patent Number: 4,887,443
[45] Date of Patent: Dec. 19, 1989

[54] AUTOMOBILE STEERING LOCK

[76] Inventor: Ching-Rong Wang, No.27,Alley 74,Lane 313,Wen-Hsien Road, Tainan City, Taiwan

[21] Appl. No.: 338,216

[22] Filed: Apr. 14, 1989

[51] Int. Cl.[4] .............................................. B60R 25/02
[52] U.S. Cl. ........................................ 70/209; 70/226
[58] Field of Search ................. 70/207, 209, 211, 212, 70/225, 226, 14

[56] References Cited

U.S. PATENT DOCUMENTS

| | | | |
|---|---|---|---|
| 4,103,524 | 8/1978 | Mitchell | 70/209 |
| 4,304,110 | 12/1981 | Fain | 70/209 |
| 4,738,127 | 4/1988 | Johnson | 70/209 |

Primary Examiner—Robert L. Wolfe
Attorney, Agent, or Firm—Bacon & Thomas

[57] ABSTRACT

An antitheft device for attachment to a steering wheel of an automobile comprising an elongated body member having a passage extending along an axis therethrough, first hook means secured to the body member for engagement with a portion of the steering wheel wherein the first hook means engage the wheel from the inside thereof with the body member extending outward beyond the periphery of the steering wheel, an elongated rod member adapted to move in telescopic fashion in the passageway of the body member along the axis, second hook means secured to the rod member for engaging the inside portion of the steering wheel dimetrically opposed to the first hook means, and means associated with the body member engaging the rod within the passage that allows the rod member to extend with respect to the body member to be locked at any of a plurality of positions.

1 Claim, 3 Drawing Sheets

AUTOMOBILE STEERING LOCK

FIELD OF THE INVENTION

The present invention relates to an automobile antitheft device, and more particularly to a device for attachment to an automobile steering wheel to prevent complete rotation thereof for securing against unauthorized driving.

BACKGROUND OF THE INVENTION

Antitheft device which attach to an automobile steering wheel have been known heretofore, as shown lately in U.S. Pat. No. 4,738,127 to Jhonson. Such antitheft device for attachment to a steering wheel of an automobile includes an elongated body member having a passage extending along an axis therethrough, an elongated rod member adapted to move in telescopic fashion in the passage way of the body member along the axis, opposed hooks for engaging the inside portion of the steering wheel and lock means associated with the body member engaging the rod within the passage for locking the rod within the passage for locking the rod member stationary with respect to the body member at any of a plurality of positions. While the antitheft device described above is functional, it includes several defects. For example, both in and out of telescopic movements of the rod member need a key to unlock the lock means. Another problem with such device is that it presents pry points wherein a rigid pin or arcuate ruler-like thin objects can be inserted through a gap between the passage and periphery of the rod member to reach a spherical bearing of the lock means and further press it down by overcoming the bias force of a spring member thereon to release it from engaging the rod member in a groove thereof that renders unlock to the device.

It is accordingly a primary object of this invention to provide an automobile steering lock that overcomes the foregoing defects associated with prior art.

Another object of this invention is to provide an automobile steering lock that performs non-return, extension only, function as in locking condition.

A further object of this invention is to provide a locking device wherein the locking mechanism is totally enclosed therein and includes no area susceptible to prying by a crowbar, rigid pin or the like.

DETAILED DESCRIPTION OF A PREFERRED EMBODIMENT

Figure 1:
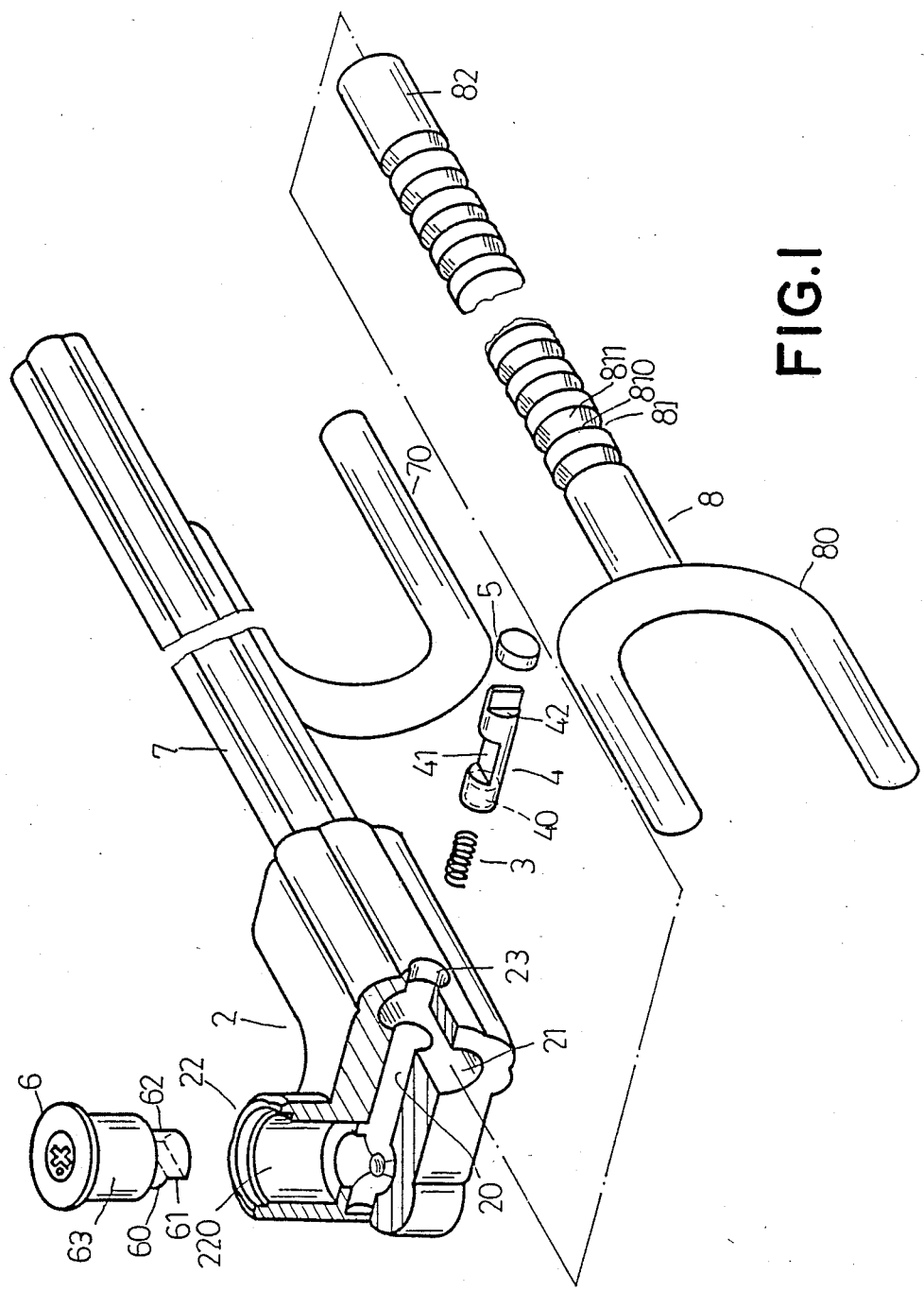
FIG. 1 is a perspective and exploded view illustrating a preferred embodiment of the present invention wherein a housing is partially cut off.
Figure 2:
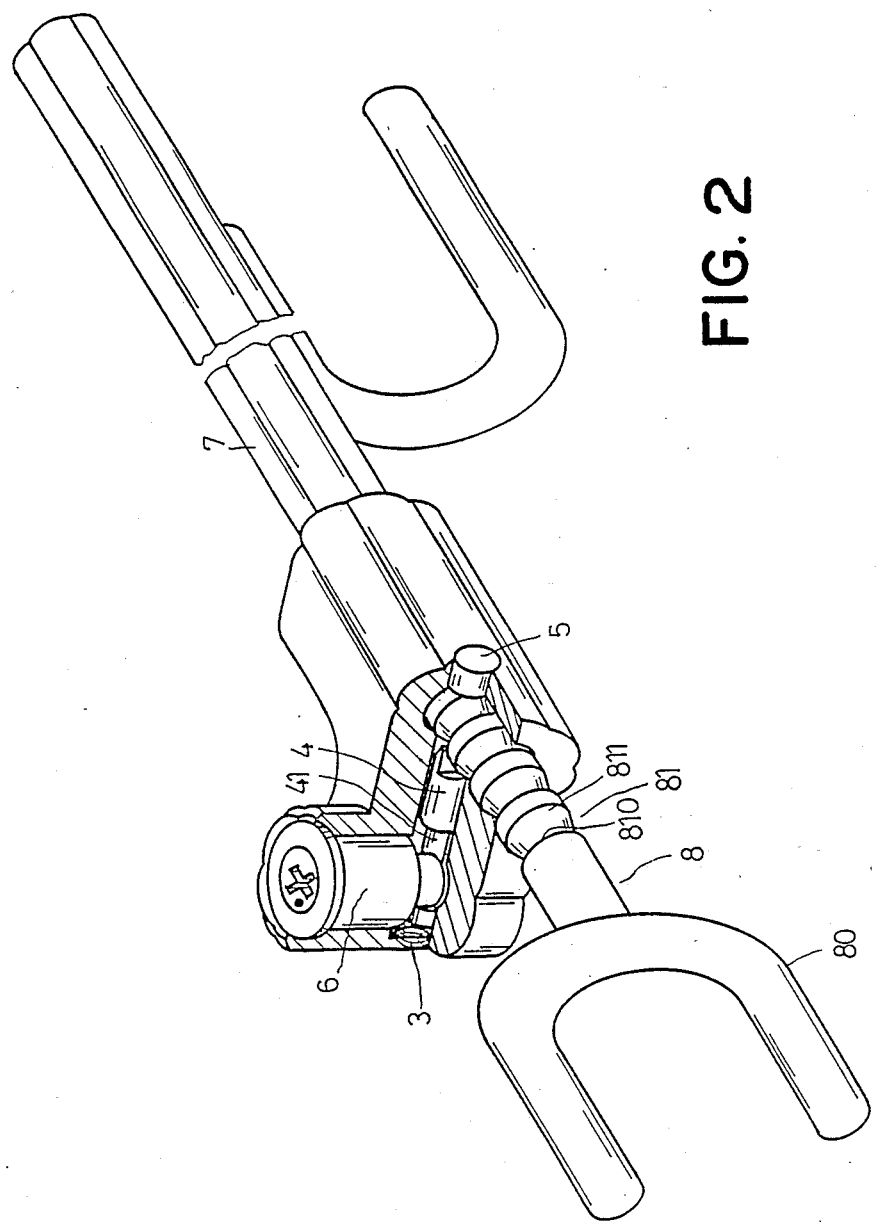
FIG. 2 is a perspective view of the device shown in FIG. 1 in assembled condition.

Referring to FIGS. 1 and 2, an automobile steering lock according to the invention which comprises an elongated body member 7, an elongated rod member 8 which is dimensioned to move in telescopic fashion within body member 7, hooks 70, 80 for engaging opposed portion of a steering wheel from the inside thereof, being respectively provided on the body member 8, a housing 2 and a locking mechanism including a locking means 6 and locating means 3, 4, being provided within the housing 2.

Said body member 7 includes an elongated tube 7 having a circular end portion (not shown) and defining a central passage (not shown) running through the body member 7. The first U-shaped hook 70 is fixedly secured to the tube 7 by means of welding adjacent the end portion such that it opens rearwardly along the body member 7. Said rod member 8 includes an elongated rod 82 of circular cross-section of which the outer diameter is dimensioned slightly less than the diameter of the central passage in the body member 7 to enable rod 82 to telescope freely within the body member 7. The second U-shaped hook 80 is fixedly secured to the front end of the rod 82 such that it opens opposite to the hook 70 for engagement with a diametrically opposed portion of a steering wheel. A plurality of annular grooves 81 axially spaced are circumferentially provided along a major portion of the rod 82. Each of the annular grooves 81 consists of a vertical side wall 810 substantially perpendicular to the longitudinal direction of the rod 82 and relatively close to the second hook 80, and a convex or slope side wall 811 relatively far from the second hook 80.

Said housing 2 is formed around the end portion of the tube 7 to form an integral structure therewith wherein the central passage extends therethrough and contains the locking mechanism including the locking means 6 and locating means 3, 4.

The housing 2 includes a boss 22 integrally offset with respect to the axis of the body member 7 and having a bore 220 therethrough into the housing 2 for firmly receiving the locking means 6 which has a conventional key lock 63 and a locking member 60 of cylindrical in shape. The locking member 60 includes an arcuate outer surface 62 and a flat or recess portion 61.

To accomodate the locating means 3, 4, a second passage 20 is transversely bored in the housing 2. Said passage 21 interconnects the bore 22 and the passage 21 in the housing 2, extends across the bore 22 and terminates within an outer wall thereof. A transverse hole 23 in alignment with the passage 20 is formed in an outer wall of the housing 2 to facilitate inserting the locating means 3, 4. The locating means includes a biasing spring 3 disposed within the transverse passage 20 with one end abutting against the inner side walk at the passage termination and an rod-like bearing 4 having a recess 40 formed in a rear end portion thereof for receiving the other end of the biasing spring 3, a tenon 42 shaped on the front end and protruding from the transverse passage 20 into the passage 21 to engage an annular groove 81 of the rod 8 and a recess portion 41 defined by a flat bottom and opposed stop side walls 43, 44. A metal disc 5 is provided to be restored in the transverse hole 23 by means of a press fit after assembly.

Figure 3:
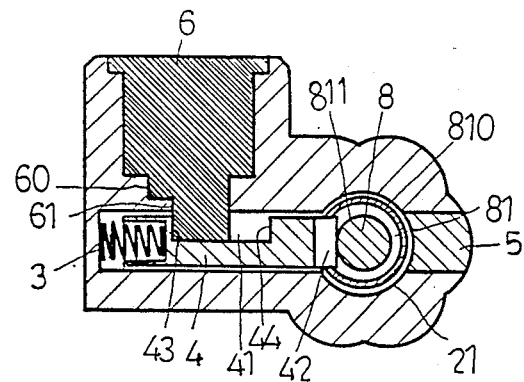
FIG. 3 is a cross-sectional view of the housing which is in unlocking condition.
Figure 4:
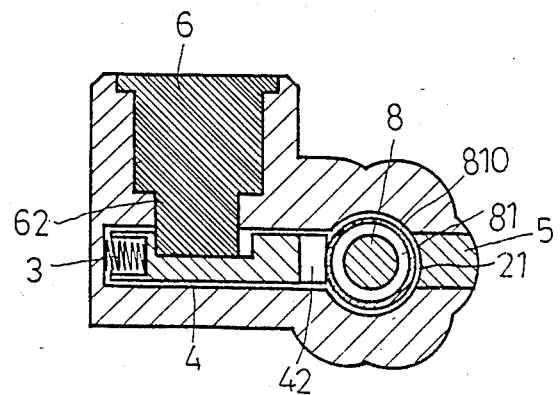
FIG. 4 is a cross-sectional of the housing which is in locking condition.

Referring to FIGS. 3 and 4, in assembly, the rod-like bearing 4 is slidably fitted in the second passage 20 wherein the reces portion 41 thereof faces upwardly and the locking member 60 of the locking means 6 firmly received in the bore 220 of the boss 22 extends downwardly into the recess portion 41.

In operation, when the flat or recess portion 61 of the locking member 60 is oriented rearwardly, as shown in FIG. 3, that allows the flat or recess portion 61 abutting on the stop side wall 43 far from the rod 82 and rod-like bearing 4 is biased towards the rod 82 whereas the tenon 42 protrudes into an annular groove to lock the device. Although in locking condition, the convex or slope side walls 811 of the grooves 81 allows the rod member 8 of this antitheft device to extend with respect to the body member 7, yet the vertical side wall engaged with the tenon 42 prohibits the rod member 8 from telescopic movement with respect to the body member 7. When the flat or recess portion 61 is turned away from the position towards and abutting on the side wall 43, as shown in FIG. 4, rod member 8 can move in telescopic fashion within the body member 7 by withdrawing the tenon 42 of the rod-like bearing 4 from annular groove 81 into passage 20.

It is to be noted that the locking member 60 can be various in shape such as rectangle in configuration with at least one side of longer dimension to unlock the device and at least one side of shorter dimension to lock the device.

Unlike the antitheft device disclosed by U.S. Pat. No. 4,738,127, the lock and unlock control of the rod member 8 is operated by the locking member 6 via the rod-like bearing 4 so that even an inserted pin may reach the tenon 42 yet it is impossible to withdraw the tenon 42 as the rod-like bearing 4 will be stopped by the locking member 60 abutting on the stop side wall 44. Also the antitheft device of the present invention can performs a non-return function, extension only, in locking condition so that steering attachment operation of this invention can be achieved without relating key.

What is claimed is:

1. An antitheft device for attachment to a steering wheel of an automobile comprising:

an elongated tubular member having an inner end, an outer end and an elongated passageway extending along its axis therethrough, said tubular member having a first U-shaped hook portion extending therefrom with the closed end of the U-shaped portion generally adjacent to but slightly spaced from the inner end of said tubular member and the open end of said U-shaped portion facing said outer end of said tubular but substantially removed therefrom, said U-shaped hook portion of said tubular member further defined by a bottom leg portion generally extending in the direction of said tubular member's axis and terminating at a distance substantially removed from said outer end of said tubular member, said U-shaped hook portion of said tubular member adapted to engage said wheel from the inside thereof with said outer end of said tubular member extending a substantial distance beyond the periphery of said wheel;

a rod member having an elongated rod adapted to extend in a telescopic manner within said passageway of said tubular member and a second U-shaped hook secured to one end of the rod, having an opening facing opposite to the first hook and adapted to engage said wheel from the inside thereof;

a plurality of spaced annular grooves each of which consisting of a vertical side wall relatively close to the second U-shaped hook and a convex or slope side wall relatively far from the second U-shaped hook, circumferentially formed in a portion of the rod;

a housing means firmly formed around an end portion of the tubular member with the elongated passageway of the tubular member extending therethrough;

a lock having a locking member extending downwardly and having at least one side of longer dimension and one side of shorter dimension;

means offset with respect to the axis of the tubular member in the housing means for firmly receiving the lock;

a transverse passageway transversely formed in the housing means and interconnecting bore means and the passageway in the tubular means in the housing means;

rod-like bearing means slidably accommodated in the transverse passageway under the lock and having a tenon member attached to an end thereof and arranged to be actuated between a locking position with the tenon member protruding into an annular groove in the rod and an unlocking position with the tenon member withdrawn from annular groove and opposed vertical side walls between the locking member being controlled to position the tenon member in locking or unlocking position through the rod-like bearing member by means of the locking member; and a spring member disposed in the transverse passageway and biasing the rod-like bearing means towards the passageway in the tubular member.

* * * * *